March 31, 1970  J. E. KOSKOVICH ET AL  3,503,620
MULTIPLE PURPOSE TRAILER CONVEYANCE
Filed Nov. 6, 1967  2 Sheets-Sheet 1

INVENTORS
JEROME E. KOSKOVICH,
BERNARD A. KOSKOVICH
BY
Williamson, Palmatier
& Bains
ATTORNEYS

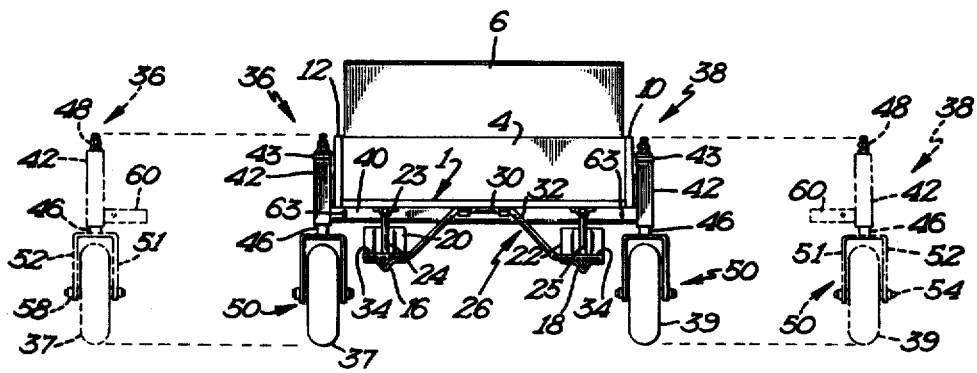
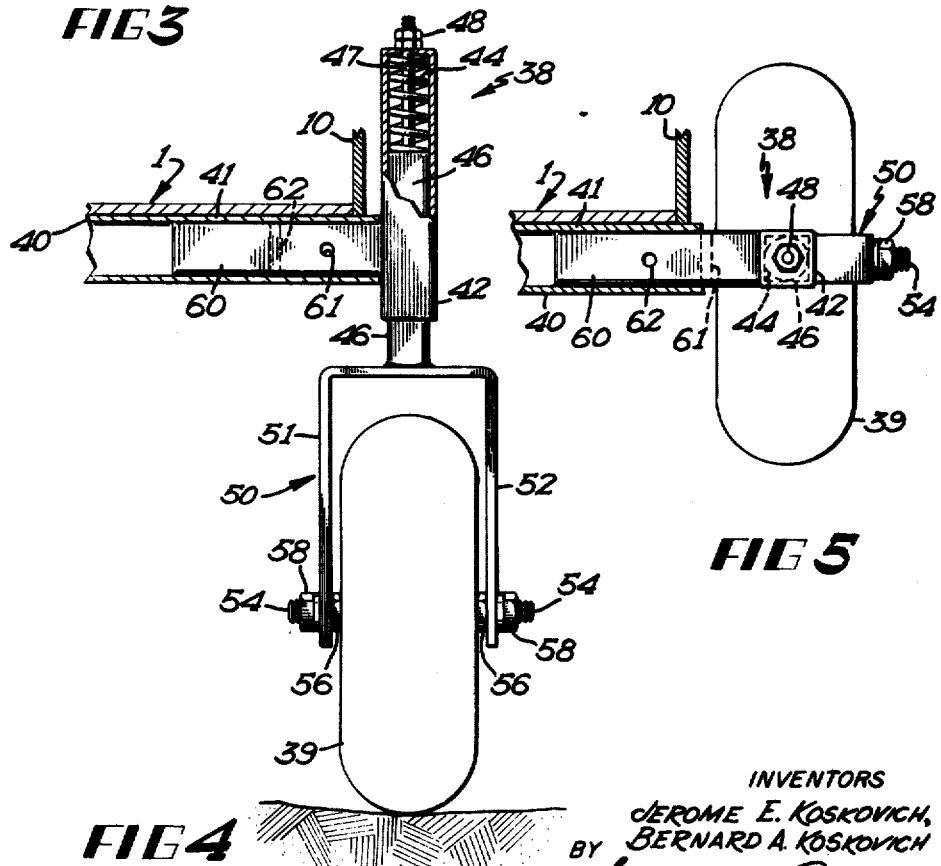

3,503,620
MULTIPLE PURPOSE TRAILER CONVEYANCE
Jerome E. Koskovich and Bernard A. Koskovich,
both of Winthrop, Minn. 55396
Filed Nov. 6, 1967, Ser. No. 680,626
Int. Cl. B62b 13/18; B60d 1/14
U.S. Cl. 280—11                                4 Claims

ABSTRACT OF THE DISCLOSURE

A trailer vehicle having an elongated, load-carrying chassis supported on runners is provided with wheel assemblies located radially outwardly beyond the sides of a platform mounted on the chassis, each of the wheel assemblies including a wheel which may be removed or shifted out of contact with the ground. A drawbar connected to the trailer is comprised of two sections which may be closely coupled as a rigid unit for connection to the rear of an automobile or coupled in an extended position in which one of the sections may pivot about a horizontal axis when the trailer is drawn behind a snowmobile.

---

In the northern portions of the United States, a winter conveyance known as a snowmobile is becoming increasingly popular. Such devices are self-propelled vehicles supported on runners for transporting passengers and articles over snow and ice. Quite often it is necessary to find some means for transporting the snowmobile over dry roads to a hunting site or any snow covered terrain where it is desired to utilize the snowmobile. Also, hunters, campers, and ice fishermen have frequently found it necessary and desirable to pull a sled-type trailer of some kind behind the snowmobile in order to transport their hunting and camping equipment, as well as any game which they might shoot. At the present time, a snowmobile owner is required to utilize a wheeled trailer for towing his snowmobile to the area of use, and then to employ a separate sled as a load-carrying trailer behind his snowmobile.

The basic objective of our invention is to provide a trailer vehicle which may be quickly and easily adapted for use as both a wheel-supported trailer for carrying a snowmobile on the highway, and as a sled which may be towed behind the snowmobile.

To this end, our unique trailer is supported directly on longitudinally extending sled runners and is further provided with wheel assemblies by means of which the trailer may be transported on a dry highway behind an automobile or truck.

As a particularly advantageous feature of our invention, the wheel assemblies are removably secured to an axle by a horizontally extending arm which slides within a tubular outer portion of the axle and is fastened thereto by means of a transverse pin. The horizontal arms of the wheel assemblies are integrally connected to an upright, shock-absorbing cylinder within which a vertical, wheel-supporting shaft is received.

A further beneficial feature of our invention resides in the installation of the wheel assemblies radially outwardly from the sled runners and the sidewalls of the trailer platform, thereby permitting the wheels to be removed or shifted angularly out of contact with the ground without any problem of interference with the trailer structure.

In the preferred form of our invention, the trailer incorporates a drawbar at its forward end by means of which it may be connected to the rear end of an automobile or to a hitch on the rear of a snowmobile for towing over dry ground or snow. The drawbar is comprised of two sections which may be either closely coupled together as a rigid unit, or adjusted to an extended position in which one section may pivot vertically about a horizontal axis. The pivotal connection is used to provide articulating action between the trailer and a snowmobile when the trailer is used as a sled.

The trailer vehicle advantageously incorporates sideboards and hinged end gates secured to the base platform, thereby forming a box-type enclosure in which either a snowmobile or gear such as camping equipment may be carried.

These and other objects and advantages of our invention will become readily apparent as the following description is read in conjunction with the accompanying drawings, of which:

FIGURE 3 is a rear, end view of our improved trailer;

FIGURE 4 is an enlarged, fragmentary end view, partially in section, showing the adjustable connection between the removable wheel assemblies and the trailer axle; and FIGURE 5 is an enlarged, fragmentary end view showing one of the wheel assemblies shifted to a non-ground-engaging position.

Figure 1:
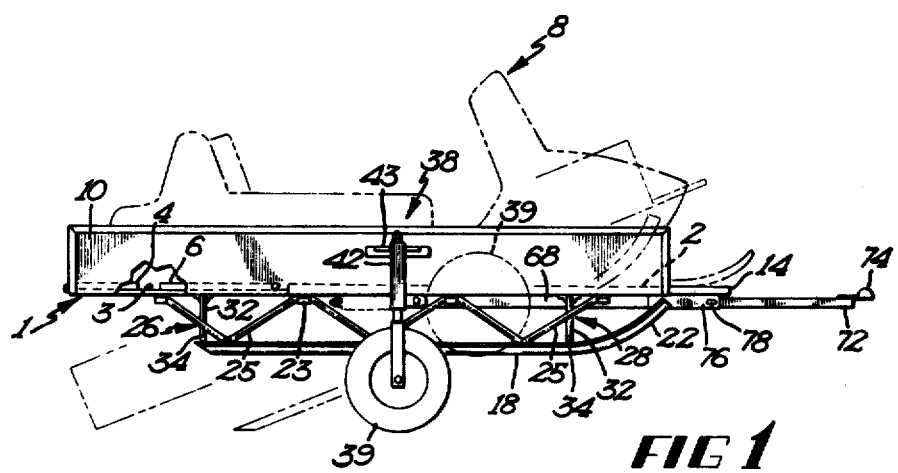
FIGURE 1 is a side elevation view of our improved trailer showing the wheels in place, and the manner in which a snowmobile would be carried thereon.
Figure 2:
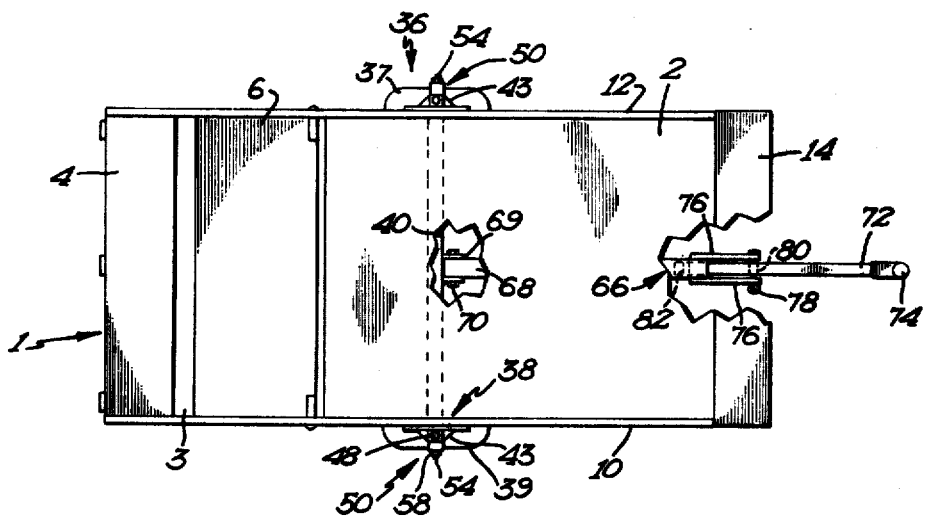
FIGURE 2 is a top, plan view of the trailer of FIGURE 1.

With references to FIGURES 1 through 3 of the drawings, the trailer vehicle of this invention is comprised of a bed or platform 1 which is preferably constructed of plywood and may be comprised of one or more layers thereof. In the preferred form of our invention, the forward section 2 of platform 1 is three-quarter inch plywood, and rear section 3 is three-eighths inch plywood. This arrangement permits hinged end gate 4 and pivoted back rest 6, which are three-eighths of an inch thick, to be flush with front section 2 when they are swung downwardly against rear section 3 in the manner indicated in FIGURE 1. Thus we provide a continuous, level deck on which a snowmobile 8 may be carried. Side walls 10 and 12 extend longitudinally along the opposite sides of platform 1, and support end gates 4 and 14 at their opposite ends. End gates 4 and 14 may be pivoted about a horizontal axis from an upright position in which they cooperate with sidewalls 10 and 12 to form a fully enclosed trailer bed to a downward, horizontal position in which they permit the trailer to accommodate and easily discharge a snowmobile 10 in the manner illustrated in FIGURE 1.

Trailer platform 1 is directly supported on sled runner means in the form of two, separate ski-type runners 16 ad 18 which extend longitudinally beneath the opposite sides thereof. Runners 16 and 18 are turned upwardly at their outer end portions 20 and 22 in a conventional manner to permit them to more easily traverse deep sow. A plurality of angled braces or struts 24 and 25 are fastened by brackets 23 to the underside of platform 1, and form therewith a chassis or base frame on which runners 16 and 18 are mounted. In order to provide proper support for trailer platform 1, transversely extending bar support members 26 and 28 are mounted between the bottom of platform 1 and runners 16 and 18. As is best shown in FIGURE 3, each of the support bars 26 and 28 is comprised of a first, horizontally extending top portion 30 which is fastened to the underside of trailer bed 1, and downwardly inclined, oppositely extending legs 32 having feet 34 which are rigidly attached, as by welding, to runners 16 and 18. Support bars 26 and 28 serve not only to support the front and rear ends of the trailer body, but also to hold runners 16 and 18 in the proper spaced relation to each other. Runners 16 and 18 would otherwise have a tendency to swing outwardly from each other because of the pivotal mounting of circular runner suspending braces 24 and 25 in U-shaped brackets 23 fastened to the underside of platform 1. The aforesaid sled-runner mounting arrangement for the trailer vehicle permits it to be towed across snow or icy terrain.

In order that the trailer vehicle may also be towed behind an automobile on a dry highway, we utilize a pair of wheel assemblies 36 and 38 which are mounted on the opposite ends of transversely extending axle 40. Wheel assemblies 36 and 38 are mounted on axle 40 in such a way that wheels 37 and 39 thereof may be moved out of supporting engagement with the ground by either removing assemblies 36 or 38 or by shifting them to a raised wheel position. The structure and method of mounting the wheel assemblies may be best understood by reference to FIGURE 4. Each wheel assembly is comprised of an upright, tubular section 42 which houses a shock-absorbing spring 44, and within which a vertically extending, wheel-supporting shaft 46 is slidably received. Shaft 46 carries an upwardly extending, reduced-diameter portion 47 which is threaded at its outer end and secured to the top of tubular housing 42 by means of nuts 48. The lower end of shaft 46 is connected to a bifurcated end portion 50 having downwardly depending arms 51 and 52, the lower ends of which are pivotally mounted on wheel axle 54. Openings in the lower end of the side arms 51 and 52 permit them to be mounted over the outer ends of bearing support axle 54. Lock nuts 56 and 58 fastened over the outer threaded ends of wheel axle 54 serve to hold arms 51 and 52 of bracket 50 in place. As wheels 37 and 39 traverse rough terrain, the shock is absorbed by the compressing action of shaft 46 acting upwardly against shock-absorbing spring 44.

For the purpose of securing wheel assemblies 36 and 38 to axle 40, upright cylinder 42 is provided with an integral, horizontally extending arm 60 having two pin holes 61 and 62 extending therethrough. Shaft 40 preferably extends all the way across the bottom of platform 1, and is of tubular construction, at least along its outer end sections 41. Square arms 60 are slidably inserted within square, tubular end sections 41 of axle 40, the square cross-section of these two pieces assisting in preventing relative rotation of movement therebetween. A positive connection between arms 60 and sleeves 41 is achieved by inserting lock pins 63 (FIGURE 3) through hole 61 in arms 60 and aligned apertures in axle sleeves 41. Upright cylinders 42 of wheel assemblies 36 and 38 are supported at their upper ends within notched brackets 43 which are fastened to sidewalls 10 and 12 of the trailer, as is more clearly shown in FIGURES 1 and 2. With wheel assemblies 36 and 38 mounted in the above-described manner, they will be in an upright position wherein wheels 37 and 39 may engage the ground as indicated in FIGURE 4. To convert the trailer vehicle for use as a sled, it is only necessary to remove pins 63 and completely remove wheel assemblies 36 and 38 by sliding arms 60 out of sleeves 41 to the disengaged, phantom line positions shown in FIGURE 3.

In some cases, where the trailer may be pulled over snow or ice to a point where conveyance on dry land is again required, it would be desirable to carry wheel assemblies 36 and 38 on the trailer body in a raised position from which they could be quickly returned to the ground-engaging position of FIGURE 4. For this purpose, wheel assembly arms 60 are provided with a second, vertically extending aperture 62 which is spaced inwardly from aperture 61. Rather than completely removing wheel assemblies 36 and 38 when operation of the trailer as a sled is required, they may be shifted out of engagement with the ground. That is accomplished by removing pins 63, withdrawing wheel assemblies 36 and 38 from supporting sleeves 41, rotating them approximately 90° to the position shown in FIGURE 5, and then inserting arms 60 back into sleeves 41 and aligning apertures 62 with the same horizontal openings in sections 41 through which pins 63 were initially installed. Lock pins 63 are then replaced. The alignment of apertures 62 of arms 60 with the locking opening in sleeves 41 will require the movement of the wheel assemblies outwardly to a position where wheels 37 and 39 will clear trailer sidewalls 10 and 12 when they are swung upwardly to the non-ground-engaging position shown in FIGURE 5, and in phantom lines in FIGURE 1.

It is to be understood that the arrangement of tubular shaft sections or sleeves 41 and slidably inserted arms 60 has been disclosed for illustrative purposes only. Other structural means for removably and adjustably mounting wheel assemblies 36 and 38 on the trailer chassis could of course be employed. For example, the axle 40 or simply short length axle stub sections on the opposite side of trailer platform 1 could be made of solid bar stock and arms 60 could be constructed of tubular sections which would slide over the axle stubs. The use of an axle-type shaft 40 extending all the way across the bottom of platform 1 and having end sections 41 which extend outwardly beyond the sidewalls 10 and 12 of the trailer is considered to be a particularly desirable way of firmly and securely supporting the wheel assemblies at a location where they are easily accessible for removal or adjustment to a position out of contact with the ground.

In order to tow the trailer vehicle behind an automobile or a snowmobile, a drawbar assembly generally indicated by reference numeral 66 in FIGURES 1 and 2 is provided. Drawbar 66 is comprised of a rear, tubular section 68 which is fastened as by ears 69 and bolt 70 to the middle of axle bar 40. A forward drawbar section 72 is slidably received within tubular section 68 and is adjustably fastened thereto. Forward section 72 carries a socket 74 for attachment to a hitch on the rear of a snowmobile or an automobile. A pair of vertical hinge plates 76 are firmly attached as by welding to the opposite sides of rear drawbar section 68, and are provided with aligned apertures at their outer ends through which a lock pin 78 may be inserted through a complementary aperture 80 in forward drawbar section 72. In FIGURES 1 and 2, outer drawbar section 72 is shown with its inner end slidably retracted in tubular drawbar section 68. In this position, the two drawbar sections are relatively rigidly secured together in such a way as to prevent any relative movement therebetween, this being the preferred arrangement for closely coupling the trailer vehicle to the rear of an automobile for highway travel. When towing the trailer vehicle behind an automobile, end gates 4 and 14 could be pivoted to an upright position so as to cooperate with sideboards 10 and 12 to form an enclosed trailer bed in which various types of gear such as camping equipment could be carried. Alternatively, end gates 4 and 14, as well as back rest 6, could be swung down to the positions shown in FIGURES 1 and 2 in order that a snowmobile 8 may be hauled on platform 1.

After detaching drawbar sockets 74 from the automobile hitch, snowmobile 8 may easily be removed by grasping forward drawbar section 72 and tipping the entire trailer vehicle vertically about wheel axle shafts 54. When the trailer has been tipped to the phantom line position shown in FIGURE 1, snowmobile 8 may be discharged by sliding it backwardly off of platform 1. The trailer may then be converted for use as a trailer to be towed behind snowmobile 8 by either removing wheel assemblies 36 and 38, or by shifting them 90° to the phantom line position shown in FIGURE 1, in the manner described above. The size and mounting location of wheel assemblies 36 and 38 is so controlled that the bottoms of wheels 37 and 39 will normally be disposed above runners 16 and 18 when the wheel assemblies are shifted upwardly to the phantom line position shown in FIGURE 1. This permits the trailer vehicle to be supported entirely on runners 16 and 18 for movement over snow or ice. This is the preferable arrangement for carrying wheel assemblies 36 and 38 on the trailer when it is being used as a sled. If wheels 37 and 39 were suspended so that they came down below sled runners 16 and 18, operation of the trailer as a sled would still be possible; however, the wheels would be in rolling engagement with the top of the snow or ice. To complete the conversion of the trailer for use as a sled, pin 78 is removed from drawbar assembly 66 and outer draw bar section 72 is extended forwardly to a position where a second, rear aperture 82 therethrough is brought into alignment with the holes through hinge plate 76. Lock pin 78 is then again inserted through hinge plate 76 and drawbar section 72. In this fully extended position, forward drawbar section 72 will be out of engagement with tubular drawbar section 68, thereby permitting it to swing vertically about the horizontal axis of lock pin 78. The pivotal movement of drawbar section 72 provides a desirable articulating action between the snowmobile and the trailer-sled as the snowmobile traverses uneven terrain.

When the trailer vehicle is being pulled as a sled behind a snowmobile, it may be utilized to carry passengers or equipment or both. When passengers are riding in the trailer-sled, back rest 6 may be swung to the upright position shown in FIGURE 3, and front gate 14 can also be raised to an upright position so as to act as a snow guard.

The embodiments of our multi-function trailer vehicle which we have shown and described are intended to be illustrative only, and we contemplate that various changes and modifications can be made without losing the basic benefits of a multiple-purpose trailer conveyance as described herein.

What we claim is:

1. A multiple function, trailer vehicle adapted to be towed on a roadbed or on snow or ice comprising: an elongated chassis having a load carrying platform with upstanding sidewalls; runner means suspended from the bottom of said chassis and extending substantially longitudinally thereof along the opposite sides of said platform; shaft sections on opposite sides of said chassis extending transversely thereof outwardly beyond each of said runner means; a pair of removable wheel assemblies on opposite sides of said chassis, each of said wheel assemblies including a generally horizontally extending arm which is slidably supported on one of said shaft sections and removably fastened thereto; each of said wheel assemblies comprising an upright, tubular portion connected to said horizontally extending arm, and adapted to slidably receive a vertical shaft member connected at its lower end to one of said wheels and removably fastened at an upper end section thereof to said upright, tubular portion; and further including a shock absorbing spring positioned within said upright, tubular portion, and extending between the top of said vertical shaft member and the top, transverse wall of said upright, tubular portion; and drawbar means extending forwardly from the front end of said trailer vehicle, whereby said vehicle may be towed behind a car as a load carrying trailer with said wheel assemblies engaging the ground, or towed behind a snowmobile as a passenger or load carrying sled with said wheel assemblies removed.

2. A trailer vehicle as defined in claim 1 wherein: said platform has a back rest pivotally mounted thereon for swinging movement about a horizontal axis between an upright position and a downwardly disposed position in which it lies in a recess so that its top is flush with the top of said platform, thereby forming a level deck on which a snowmobile may be carried.

3. A trailer vehicle as defined in claim 1 wherein: said runner means comprises two separate sled runners disposed under opposite sides of said platform; and further including at least one substantially transversely extending support bar having a first section thereof fastened to the underside of one end of said platform, and downwardly depending oppositely disposed leg sections thereof supported at their lower ends on said separate sled runners.

4. A multiple function, trailer vehicle adapted to be towed on a roadbed or on snow or ice comprising: an elongated chassis having a load carrying platform with upstanding sidewalls; runner means suspended from the bottom of said chassis and extending substantially longitudinally thereof along the opposite sides of said platform; shaft sections on opposite sides of said chassis extending transversely thereof outwardly beyond each of said runner means; a pair of removable wheel assemblies on opposite sides of said chassis, each of said wheel assemblies including a generally horizontally extending arm which is slidably supported on one of said shaft sections and removably fastened thereto; said horizontally extending arm of each of said wheel assemblies having first and second apertures extending therethrough along angular lines with respect to each other and longitudinally spaced apart along said arm, the angular disposition of said apertures being such that said wheel assemblies will be supported in ground engaging position when one of said apertures is aligned with a complementary aperture in each of said shaft sections, and whereby each of said wheel asemblies will be supported on said trailer vehicle with the wheels thereof positioned substantially above said runner means when the other one of said apertures is aligned with said complementary aperture, said wheel assemblies being removably and adjustably secured to said shaft sections by means of a removable fastener inserted through one of said apertures in said horizontally extending arm and said complementary aperture in said shaft sections; drawbar means extending forwardly from the front end of said trailer vehicle, whereby said vehicle may be towed behind a car as a load carrying trailer with said wheel assemblies engaging the ground, or towed behind a snowmobile as a passenger or load carrying sled with said wheel assemblies removed.

References Cited

UNITED STATES PATENTS

| 2,885,214 | 5/1959 | Toohey | 280—8 |
| 2,926,021 | 2/1960 | Altadonna | 280—11 |
| 3,102,649 | 9/1963 | Whalen | 280—414 |
| 3,326,573 | 6/1967 | Neitzey | 280—414 |

LEO FRIAGLIA, Primary Examiner

ROBERT R. SONG, Assistant Examiner

U.S. Cl. X.R.

280—43